United States Patent
Slutsker et al.

(10) Patent No.: US 11,074,229 B1
(45) Date of Patent: Jul. 27, 2021

(54) DISTRIBUTED READ-ONLY DATABASE SERVICE

(71) Applicant: Amazon Technologies, Inc., Seattle, WA (US)

(72) Inventors: Alexander Slutsker, Seattle, WA (US); David Michael Hurley, Seattle, WA (US); Remo Antonio Cocco, Seattle, WA (US); Siu Nam Wong, Seattle, WA (US); Aparna Raman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 259 days.

(21) Appl. No.: 15/928,007

(22) Filed: Mar. 21, 2018

(51) Int. Cl.
*G06F 16/27* (2019.01)
*G06F 16/21* (2019.01)
*G06F 16/2458* (2019.01)

(52) U.S. Cl.
CPC ........ *G06F 16/211* (2019.01); *G06F 16/2471* (2019.01); *G06F 16/27* (2019.01)

(58) Field of Classification Search
None
See application file for complete search history.

(56) References Cited

U.S. PATENT DOCUMENTS

| | | |
|---|---|---|
| 6,523,032 B1 | 2/2003 | Sunkara et al. |
| 8,676,843 B2 | 3/2014 | Bayliss et al. |
| 8,918,506 B1 * | 12/2014 | Clubb .................. G06Q 20/105 |
| | | 709/226 |
| 9,009,196 B2 | 4/2015 | Ram et al. |
| 9,053,100 B1 | 6/2015 | Malige et al. |
| 9,207,966 B2 | 12/2015 | Slavi et al. |
| 2014/0108917 A1 * | 4/2014 | Style .................... G06F 17/2247 |
| | | 715/234 |
| 2017/0116207 A1 * | 4/2017 | Lee ........................ G06F 16/178 |

* cited by examiner

*Primary Examiner* — Tuankhanh D Phan
(74) *Attorney, Agent, or Firm* — Robert C. Kowert; Kowert, Hood, Munyon, Rankin & Goetzel, P.C.

(57) ABSTRACT

Methods, systems, and computer-readable media for a distributed read-only database service are disclosed. Using a read-only database service, one or more host groups are selected from a plurality of available host groups in a distributed system. The one or more host groups are selected for a particular dataset based at least in part on a size of the dataset and on a transaction rate for the dataset. The selected one or more host groups comprise one or more hosts comprising storage resources. A read-only database comprising elements of the dataset is generated. The read-only database is deployed to the storage resources of the one or more host groups in the distributed system. The one or more host groups are configured to serve a plurality of read requests from clients for the elements of the read-only database.

20 Claims, 7 Drawing Sheets

DISTRIBUTED READ-ONLY DATABASE SERVICE

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in varied ways.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for implementing a distributed read-only database service are described. Using the techniques described herein, a read-only database service may deploy read-only databases to various host groups in a distributed system. A read-only database may include key-value pairs. The service may select one or more host groups for a dataset, and the dataset assigned to a host group may be replicated across the hosts (servers) in that group. Using the service, datasets may be assigned to host groups automatically based (at least in part) on metrics such as the expected maximum size of the dataset and the expected transaction rate of the dataset. In one embodiment, the number of host groups for a dataset may be selected by the service based (at least in part) on the expected maximum size of the dataset. For example, datasets exceeding the storage capacity of one host may be partitioned across multiple host groups. In one embodiment, the number of hosts per host group may be selected by the service to meet the expected transaction rate, where more hosts may be used for higher transaction rates and fewer hosts may be used for lower transaction rates. In one embodiment, a host group may include a minimum of three hosts, e.g., in order to provide fault tolerance for the data replicated across the hosts in the host group. The service may generate a read-only database for the dataset and deploy that read-only database to the hosts in the selected host group(s). A client of the service may use a client library to identify an appropriate host group as the recipient of a particular request for the read-only database. In one embodiment, by applying a hashing function to a key and a dataset name, the client library may determine and cache the name or address of the host group that serves requests for that key. In one embodiment, clients may make direct connections to host groups or to host-group-specific load balancers, thereby avoiding a service-wide routing layer and providing fault tolerance across many host groups maintained by the service. The read-only database service may provide low-latency access in a distributed manner to datasets that are infrequently updated.

As one skilled in the art will appreciate in light of this disclosure, embodiments may be capable of achieving certain technical advantages, including some or all of the following: (1) reducing latency for read requests by enabling direct connections between clients and host groups without using a routing layer, (2) reducing latency for read requests by enabling compression of datasets that are not subject to frequent updates, (3) reducing the use of storage and memory resources by enabling compression of datasets that are not subject to frequent updates, (4) providing improved fault tolerance by isolating host groups from one another, (5) providing improved scalability through scaling of host groups and hosts, (6) allowing large datasets to be partitioned across multiple host groups, and so on.

Figure 1:
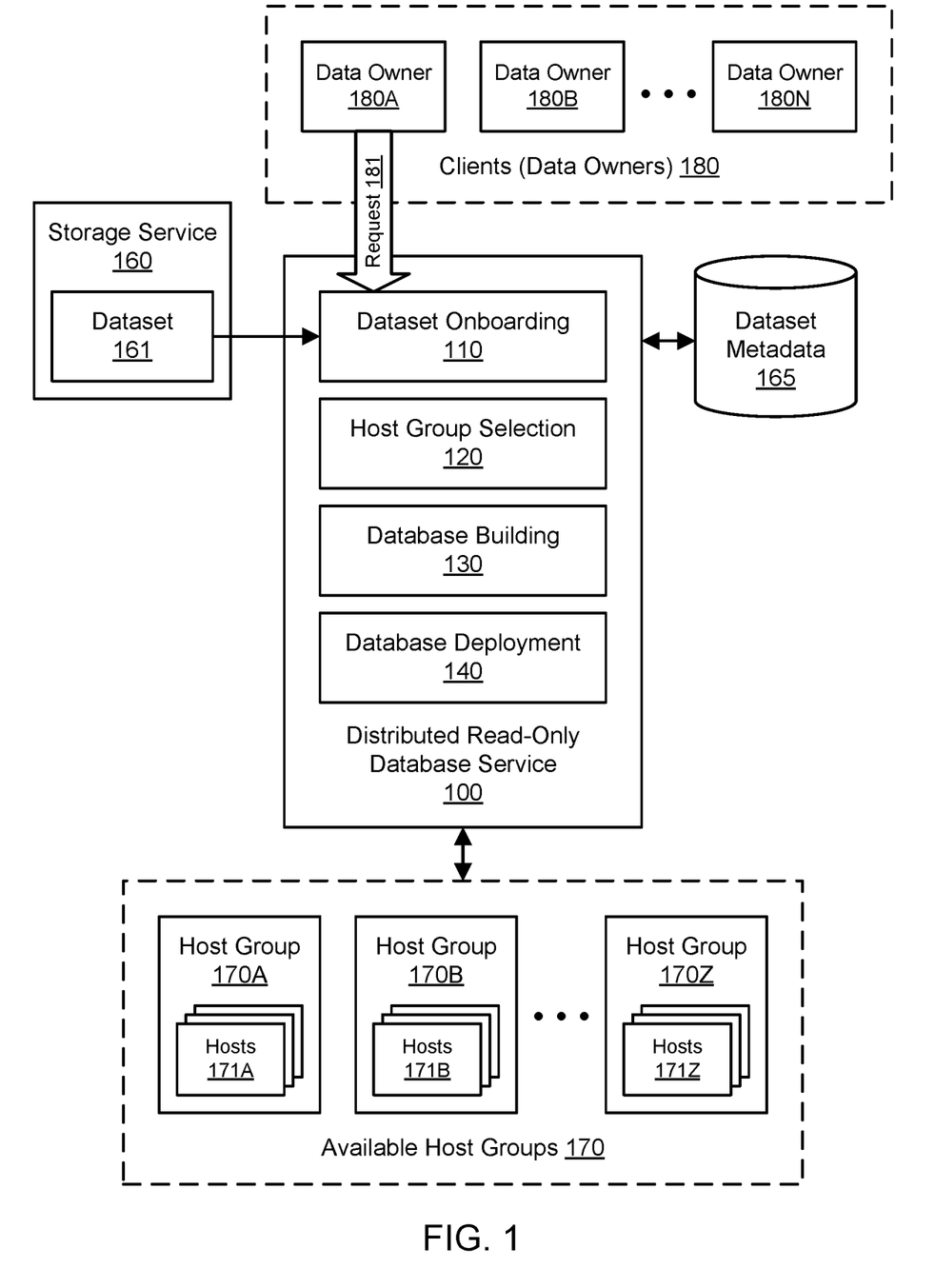
FIG. 1 illustrates an example system environment for a distributed read-only database service, according to one embodiment.

FIG. 1 illustrates an example system environment for a distributed read-only database service, according to one embodiment. In some embodiments, a distributed read-only database service 100 may provide intelligent and automated management of read-only datasets in a distributed system. The service 100 may manage read-only datasets on behalf of users (e.g., dataset owners) who provide the datasets. The datasets may be infrequently updated. The service 100 may represent aspects of a control plane through which users may invoke the automated selection, deployment, and management of read-only database hosts in a distributed system. The hosts may be part of host groups, where elements of data are replicated throughout the hosts in a host group such that any host can serve any request directed to the host group. Data-consuming clients may then make direct connections with host groups (or with host-group-specific load balancers), and not with a system-wide routing layer, to retrieve elements of data from read-only databases. Data-consuming clients may include instances of a client library, and the client library may permit a client to identify the host group for a particular dataset or partition of a dataset.

In various embodiments, the service 100 may include various components for operations such as dataset onboarding 110, host group selection 120, database building 130, and/or database deployment 140. Using the dataset onboarding component 110, the service 100 may receive requests for hosting read-only datasets from data-owning clients 180. Although three data owners 180A, 180B, and 180N are shown for purposes of illustration and example, any suitable number and configuration of data-owning clients may be used with the service 100. The data-owning clients 180 may represent users, user groups, or other user accounts that are responsible for maintaining the content of various datasets. Datasets may include key-value pairs. For example, one particular dataset may indicate similar items in an online merchant's catalog for a particular item identified by a key. The data owner associated with the similarity dataset may periodically update the dataset, e.g., once per day based on analysis of data such as customer orders. In some embodiments, the data owners 180A-180N may be located in different geographical locations (e.g., different data centers) and/or different regions of a distributed system.

As shown in the example of FIG. 1, a particular client 180A may provide a hosting request 181 to the service 100. The request 181 may be received using an application programming interface (API) or other programmatic interface offered by the read-only database service 100. For example, the service 100 may expose an API called RegisterDataset that data-owning clients may invoke. The request 181 may include or be associated with metadata and/or metrics for the dataset 161. In one embodiment, the request 181 may indicate a dataset name. In one embodiment, the request 181 may indicate a location at which the dataset 161 is stored, e.g., in a storage service 160 accessible to the read-only database service 100. The storage service 160 may, for example, store documents in "buckets" associated with particular user accounts. In one embodiment, the request 181 may indicate access credentials that enable the read-only database service 100 to read the dataset 161 from the storage service 160. In one embodiment, the request 181 may indicate a maximum size that the data owner 180A expects the dataset 161 to reach. In one embodiment, the request may indicate a number of partitions of the dataset 161, e.g., when deployed to host groups in a distributed system. In one embodiment, the request may indicate the maximum transaction rate (e.g., in transactions per second) which the data owner 180A expects for the dataset 161. Using the dataset onboarding component 110, the read-only database service 100 may retrieve the dataset 161 identified in the request 181. In one embodiment, the service 100 may periodically poll the storage service 160 until the dataset 161 is available. In one embodiment, the service 100 may periodically poll the storage service 160 to determine whether the dataset 161 has been updated and may perform dataset onboarding 110 if an update is found.

The distributed read-only database service 100 may use a data store 165 to store metadata associated with hosted datasets. For example, the dataset metadata 165 may include the name of the dataset 161, the storage location of the dataset, the access credentials for the storage location, the maximum size as indicated in the request 181, the number of partitions as indicated in the request, the maximum transaction rate as indicated in the request, and so on. The distributed read-only database service 100 may retrieve the metadata associated with a particular dataset in order to perform particular tasks. The distributed read-only database service 100 may also update the metadata in the data store 165. In one embodiment, a service may use an API such as GetAllDatasets to fetch metadata about registered datasets from the database metadata data store 165.

Using the component for host group selection 120, the service 100 may select one or more host groups to host the dataset 161. The service 100 may be offered in a distributed system, and the distributed system may include available host groups 170 that are not currently in use for serving read-only database requests. Although three available host groups 170A, 170B, and 170Z are shown for purposes of illustration and example, any suitable number and configuration of host groups may be used with the service 100. Each host group may include one or more hosts. In one embodiment, a host group may include a minimum of three hosts, e.g., in order to provide fault tolerance for the data replicated across the hosts in the host group. For example, host group 170A may include three hosts 171A, host group 170B may include three hosts 171B, and host group 170Z may include three hosts 171Z. Individual hosts may represent servers with processor resources, memory resources, storage resources, and network capabilities, e.g., as implemented by the example computing device 3000 shown in FIG. 7. Hosts may belong to different instance types that vary in their hardware and/or software configurations. In various embodiments, the hosts within a host group may be similarly configured (e.g., with similar processor resources, memory resources, storage resources, and network capabilities) or differently configured (e.g., with different processor resources, memory resources, storage resources, and/or network capabilities). The processor resources, memory resources, storage resources, and/or network capabilities may vary from host group to host group. The host groups 170A-170Z may be located in the same or different geographical locations (e.g., different data centers) and/or regions of a distributed system. The various hosts within a particular host group may also be located in the same or different geographical locations (e.g., different data centers) and/or regions of a distributed system. In one embodiment, different hosts within the same host group may be distributed across different data centers to provide additional fault tolerance.

In one embodiment, the read-only database service 100 and host groups 170 may be implemented using resources of a provider network. In one embodiment, the provider network may represent a network set up by an entity such as a private-sector company or a public-sector organization to provide one or more services (such as various types of network-accessible computing or storage) accessible via the Internet and/or other networks to a distributed set of clients. In one embodiment, the provider network may include numerous services that collaborate according to a service-oriented architecture to provide resources such as the read-only database service and host groups. The provider network may implement a distributed system with components located in different geographical zones or regions. In one embodiment, the provider network may include numerous data centers hosting various resource pools, such as collections of physical and/or virtualized computer servers, storage devices, networking equipment and the like, that are used to implement and distribute the infrastructure and services offered by the provider. In one embodiment, compute resources may be offered to clients in units called "instances," such as virtual or physical compute instances.

In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In one embodiment, the read-only database service 100 may be implemented as a service of the provider network, the service may be implemented using a plurality of different instances that are distributed throughout one or more networks, and each instance may offer access to the functionality of the service to various clients. In one embodiment, because resources of the provider network may be under the control of multiple clients (or tenants) simultaneously, the provider network may be said to offer multi-tenancy and may be termed a multi-tenant provider network. In one embodiment, the functionality of the provider network, such as the read-only database service and host groups, may be offered to clients in exchange for fees.

Figure 7:
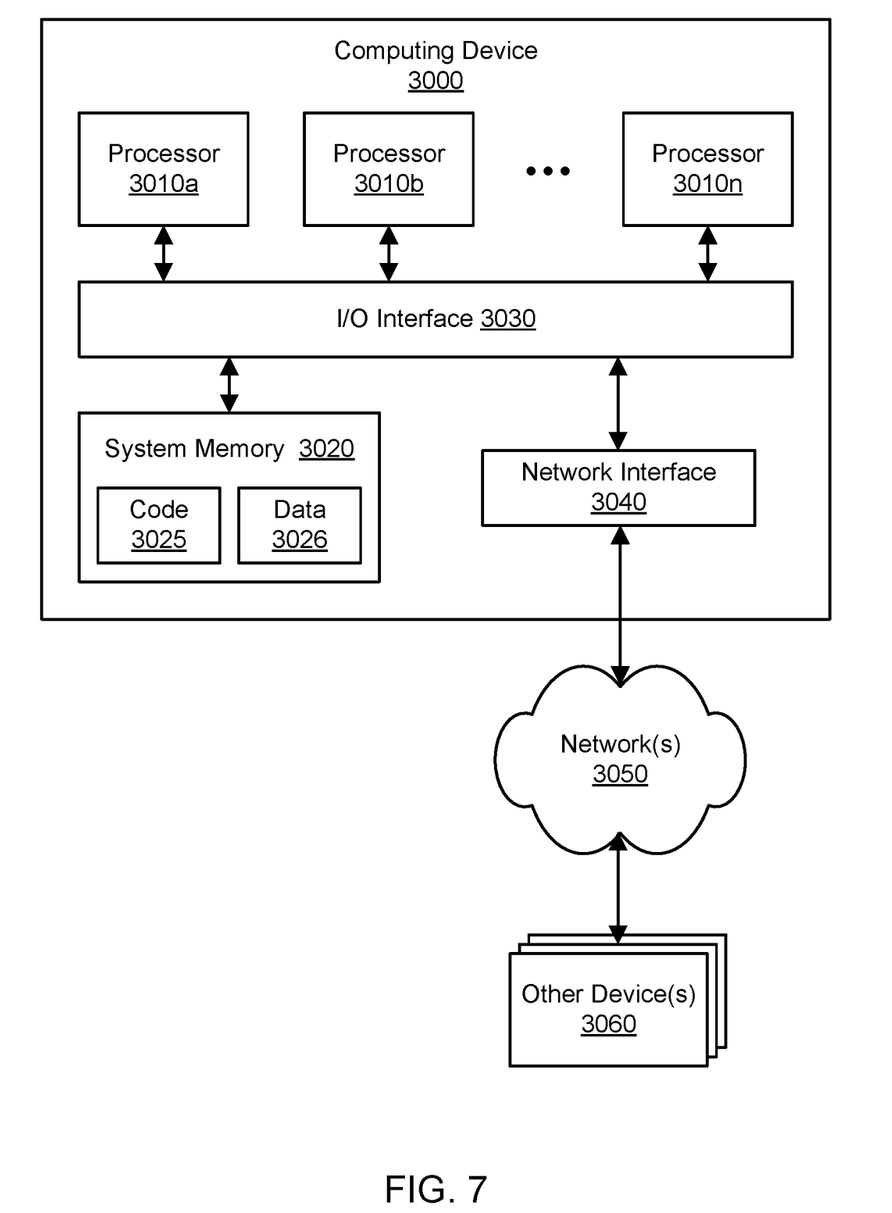
FIG. 7 illustrates an example computing device that may be used in some embodiments.

In one embodiment, the read-only database service and host groups may be implemented using any suitable number and configuration of computing devices, any of which may be implemented by the example computing device 3000 illustrated in FIG. 7. In some embodiments, the computing devices may be located in any suitable number of data centers or geographical locations. In various embodiments, at least some of the functionality of the read-only database service and host groups may be provided by the same computing device or by different computing devices. In various embodiments, if any of the components of the read-only database service are implemented using different computing devices, then the components and their respective computing devices may be communicatively coupled, e.g., via one or more networks. In one embodiment, any of the components of the read-only database service may represent any combination of software and hardware usable to perform their respective functions. In some embodiments, operations implemented by the read-only database service and host groups may be performed automatically, e.g., without a need for user initiation or user intervention after an initial configuration stage, and/or programmatically, e.g., by execution of program instructions on at least one computing device. In some embodiments, the read-only database service and host groups may include additional components not shown, fewer components than shown, or different combinations, configurations, or quantities of the components shown.

In one embodiment, clients of the read-only database service and host groups may represent external devices, systems, or entities with respect to the system. In one embodiment, the client device(s) may be implemented using any suitable number and configuration of computing devices, any of which may be implemented by the example computing device 3000 illustrated in FIG. 7. In one embodiment, clients or other components may convey network-based service requests to the read-only database service or host groups via one or more networks. In various embodiments, the network(s) may encompass any suitable combination of networking hardware and protocols necessary to establish network-based communications between, for example, client devices and the read-only database service or host groups. In one embodiment, for example, the network(s) may generally encompass the various telecommunications networks and service providers that collectively implement the Internet. In one embodiment, the network(s) may also include private networks such as local area networks (LANs) or wide area networks (WANs) as well as public or private wireless networks. In one embodiment, for example, both a given client device and the service or host groups may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the read-only database service or host groups. In one embodiment, client devices may communicate with the read-only database service or host groups using a private network rather than the public Internet. In various embodiments, the various components of the system 100 may also communicate with other components of the read-only database service or host groups using one or more network interconnects.

Figure 2:
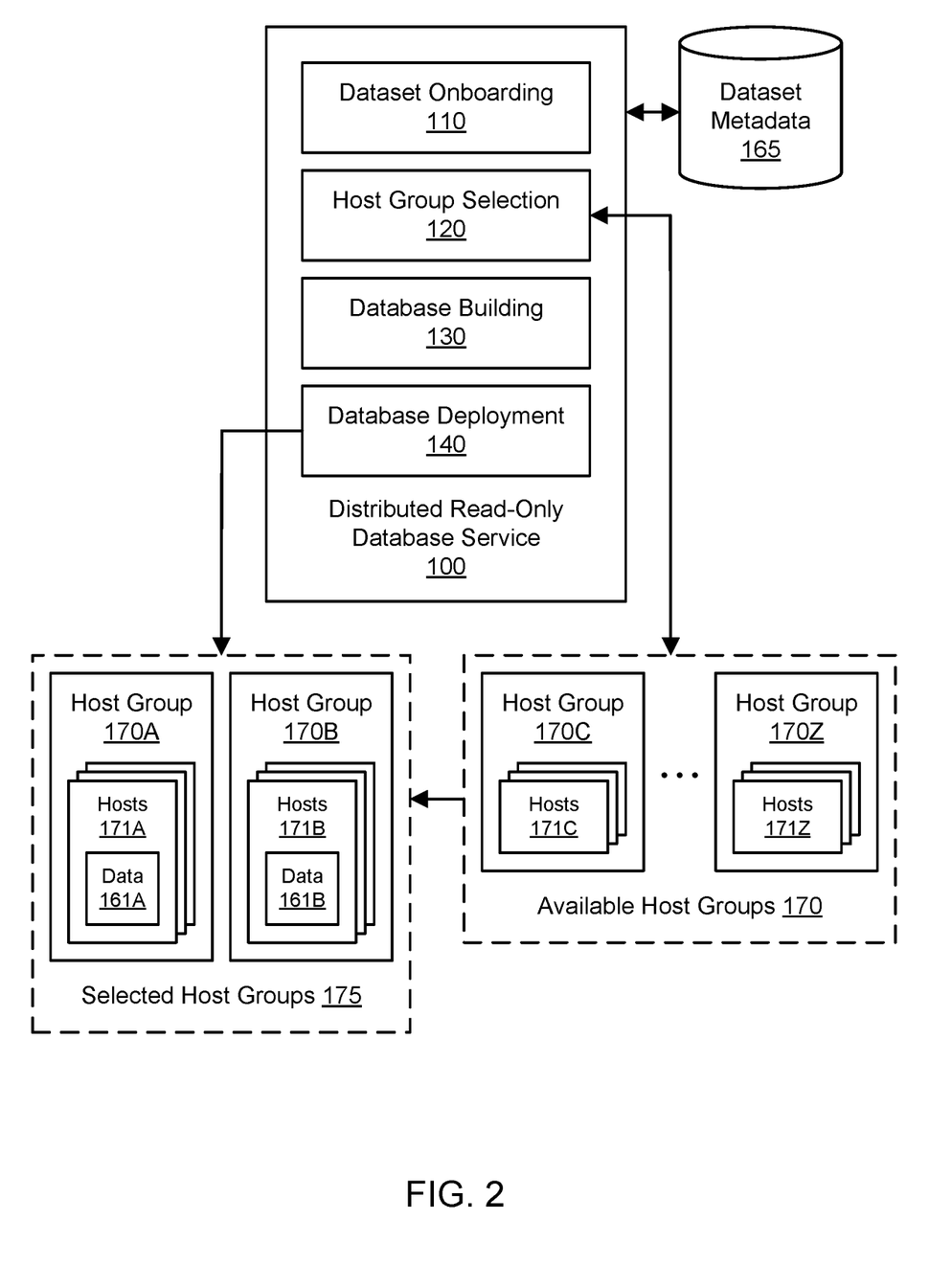
FIG. 2 illustrates further aspects of the example system environment for a distributed read-only database service, including selection of host groups and deployment to host groups, according to one embodiment.

FIG. 2 illustrates further aspects of the example system environment for a distributed read-only database service, including selection of host groups and deployment to host groups, according to one embodiment. Using the component for host group selection 120, the service 100 may select one or more host groups to host the dataset 161. In one embodiment, the service 100 may select the host group(s) for the dataset 161 from the available host groups 170 based (at least in part) on the metadata and/or metrics, such as the expected maximum size of the dataset and the expected transaction rate of the dataset. In one embodiment, the number of host groups for the dataset 161 may be selected by the service 100 based (at least in part) on the expected maximum size of the dataset. For example, datasets exceeding the storage capacity of one host may be partitioned across multiple host groups. In one embodiment, the number of host groups may be selected by the service 100 based (at least in part) on the number of partitions as indicated in the request 181. In one embodiment, the number of hosts per host group may be selected by the service 100 to meet the expected transaction rate, where more hosts may be used for higher transaction rates and fewer hosts may be used for lower transaction rates. In one embodiment, the number of host group(s) and the number of hosts per group may be selected in order to minimize the computational and storage resources (e.g., the number of hosts) assigned to the dataset 161. In one embodiment, hosts may vary in their storage capacity, and hosts for a dataset 161 may be selected based (at least in part) on the similarity of their storage capacity to the expected maximum size of the dataset. In one embodiment, hosts may vary in their maximum transaction rate, and hosts for a dataset 161 may be selected based (at least in part) on their maximum transaction rate in order to meet the expected transaction rate.

As shown in the example of FIG. 2, the host groups 175 selected for the dataset 161 may include two host groups 170A and 170B, leaving host groups 170C (including hosts 171C) through 170Z (including host groups 171Z) in the pool of available host groups 170. In one embodiment, the number of host groups in the set of selected host groups 175 may be determined based (at least in part) on the size of the dataset 161 in comparison to the storage capacity of individual hosts 171A and individual hosts 171B in the respective host groups 170A and 170B. For example, as shown in FIG. 2, the dataset 161 may be partitioned into two sets of data, with one set being assigned to the first host group 170A and the other set being assigned to the second host group 170B. In some embodiments, a minimum of one host group may be selected for any given dataset. To perform the selection 120, the service 100 may access metadata regarding the available host groups 170, such as their current availability along with a description of their processor resources, memory resources, storage resources, and/or network capabilities. In one embodiment, the service 100 may interact with a resource manager of the distributed system in order to reserve and/or configure the selected host groups 175 for hosting the dataset 161.

In one embodiment, the service 100 may validate the dataset 161. Validation may include determining that elements of the dataset 161 have valid data types and values within appropriate ranges, that the dataset is properly formatted, and so on. In one embodiment, validation may be performed according to validation techniques specified by the data-owning client 180A, e.g., by calling a program indicated by the client. In one embodiment, both new datasets and updates to datasets may be subjected to validation. For example, updates may be validated for significant changes in size in comparison to previous versions. A data owner may be warned if the size of a dataset has increased or decreased beyond expectations, and automatic deployment of the update may be halted. In one embodiment, a least squares linear size prediction technique may be used for analyzing size changes in updated data sets.

Using the component for database building 130, the read-only database service 100 may generate a read-only database comprising elements of the dataset 161. The read-only database may include key-value pairs. In one embodiment, the read-only database may represent a compressed version of the dataset 161, e.g., a version that takes less space to store and/or less time to retrieve individual elements. In one embodiment, the read-only database may be implemented using a B-tree or other data structure that can be traversed efficiently. In one embodiment, the read-only database may include multiple partitions, where each partition can be deployed to a different host group of the selected host groups 175. As shown in the example of FIG. 2, the read-only database may be divided into two partitions 161A and 161B. In one embodiment, the incoming dataset 161 may be transformed into the read-only database during off-peak hours, and as such, it may be hours after the request 181 is received (or an update to the dataset 161 is identified) that the resulting read-only database is generated and deployed to the host group(s). For at least this reason, the service 100 may be used to manage datasets that are updated infrequently (e.g., every few hours or days).

Using the component for database deployment 140, the read-only database may be deployed to the selected host group(s) 175 by the read-only database service 100. Deployment may include copying elements of the read-only database to the storage resources of the individual hosts. In one embodiment, the data deployed to a host group may be replicated across the hosts in that group, such that any host in the group may serve a request for any element of the data assigned to the group. For example, each of the hosts 171A in the host group 170A may include copies of the read-only database partition 161A, and each of the hosts 171B in the host group 170B may include copies of the read-only database partition 161B. In one embodiment, the read-only database may be partitioned across multiple host groups, such that some elements of the dataset may be served exclusively by one host group while other elements of the dataset may be served exclusively by another host group. As shown in FIG. 2, for example, a dataset 161 exceeding the storage capacity of one host may be partitioned across multiple host groups 170A and 170B. In one embodiment, datasets registered with the read-only database service 100 may be updated infrequently and may grow in size slowly, such that the number of host groups needed to host the dataset 161 may also change slowly.

Figure 3:
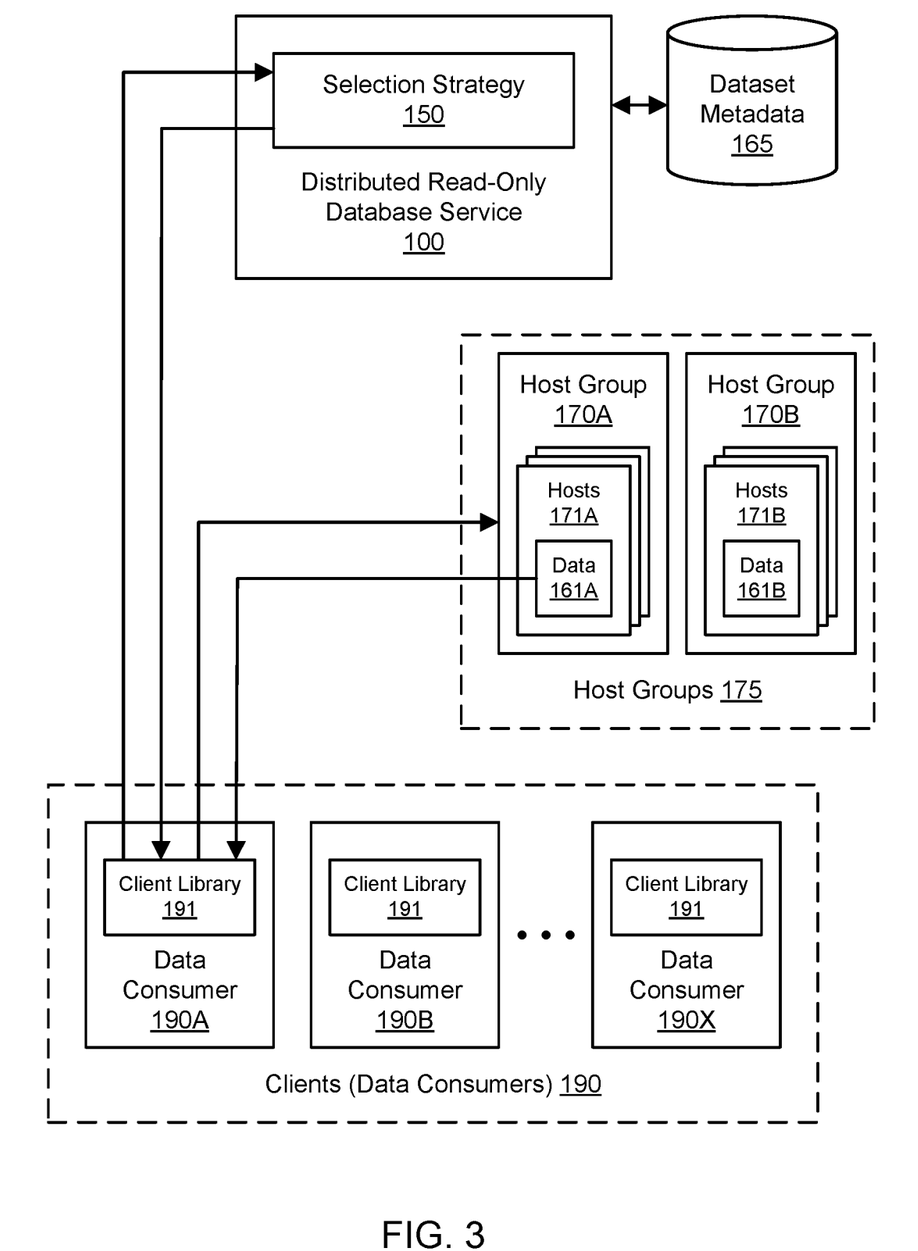
FIG. 3 illustrates further aspects of the example system environment for a distributed read-only database service, including the use of a client library by data consumers to directly access host groups, according to one embodiment.

FIG. 3 illustrates further aspects of the example system environment for a distributed read-only database service, including the use of a client library 191 by data consumers 190 to directly access host groups, according to one embodiment. The selected host group(s) 175 may serve requests from data-consuming clients 190 for the elements of the read-only database. Although three data consumers 190A, 190B, and 190X are shown for purposes of illustration and example, any suitable number and configuration of data-consuming clients may be used with the service 100. The data-consuming clients 180 may represent other services or systems that seek to obtain elements of the dataset 161. If the dataset 161 represents key-value pairs, then one of the clients 190A-190X may provide a key to one of the host groups 175 and receive a value in response. For example, if the dataset 161 represents similar items in an online merchant's catalog for a particular product identifier, and one of the data consumers 170 represents a service that builds (or helps to build) a product page indicating similar items for that particular product, then that service may obtain the list of similar item identifiers from the host groups 175 by supplying the identifier of the particular product.

A data-consuming client may use a client library 191 to identify an appropriate host group as the recipient of a particular request for the read-only database. The request may seek one or more values associated with a particular key in the read-only database. In one embodiment, the client library 191 at a particular data consumer 190A may request and obtain, from the service 100, a selection strategy 150 for a particular dataset (e.g., as identified by a dataset name). For example, the service 100 may expose an API called GetHostGroupSelectionStrategy that data-consuming clients may invoke. In one embodiment, the selection strategy 150 may be stored in the dataset metadata data store 165 and retrieved by the service 100 when a client asks for it. The data-consuming client 190A may then cache the selection strategy 150 for use whenever the client seeks to obtain elements of that particular read-only dataset from the distributed read-only database. In one embodiment, the selection strategy 150 may include a list of host groups associated with a particular dataset. In one embodiment, the selection strategy 150 may include a hashing function that can be used to determine the host group associated with a particular key. In one embodiment, by applying the hashing function to the key and the dataset name, the client library 191 may determine the name or address of the host group that serves requests for that key. For example, the data-consuming client 190A may use the cached selection strategy 150 to identify the host group 170A responsible for a particular key. The client 190A may then direct a request to that host group 170A and receive a response including one or more values associated with the key in the read-only database partition 161A. In one embodiment, an API called GetValues may be used by data-consuming clients to access the distributed read-only database in this manner.

In one embodiment, a host group may be associated with a load balancer, and the load balancer may be specific to the host group. In one embodiment, the load balancer may distribute requests across hosts in the host group on any suitable basis, e.g., using a round-robin approach and/or selecting the host with the least number of connections. In one embodiment, by caching the selection strategy 150 at clients, the clients may make direct connections to host groups or to host-group-specific load balancers and not to a centralized routing layer that would represent a single point of failure for all the host groups maintained by the service 100. Accordingly, the read-only database service 100 may provide a degree of isolation and fault tolerance among different host groups.

In one embodiment, the read-only database may be updated infrequently, e.g., only once every few hours. In one embodiment, the service 100 may expose an API called UpdateDataset that data-owning clients may invoke when a dataset is updated so that a new version of the read-only database may be built and deployed. In one embodiment, the service 100 may determine updates by polling the storage service for updates to the storage location of a dataset. In one embodiment, hosts within a host group may be updated at different times for a particular dataset, such that one host may sometimes provide a different version of the dataset than another host. In one embodiment, while the service 100 is busy generating and deploying an updated read-only database, some requests from clients may be served using an additional "hot" storage layer that may be updated more frequently than the read-only database itself. For example, updates to the dataset 161 may be cached in this storage layer, and requests for a particular key may be served using this storage layer if the key has been updated since the read-only database was generated for the dataset.

Figure 4:
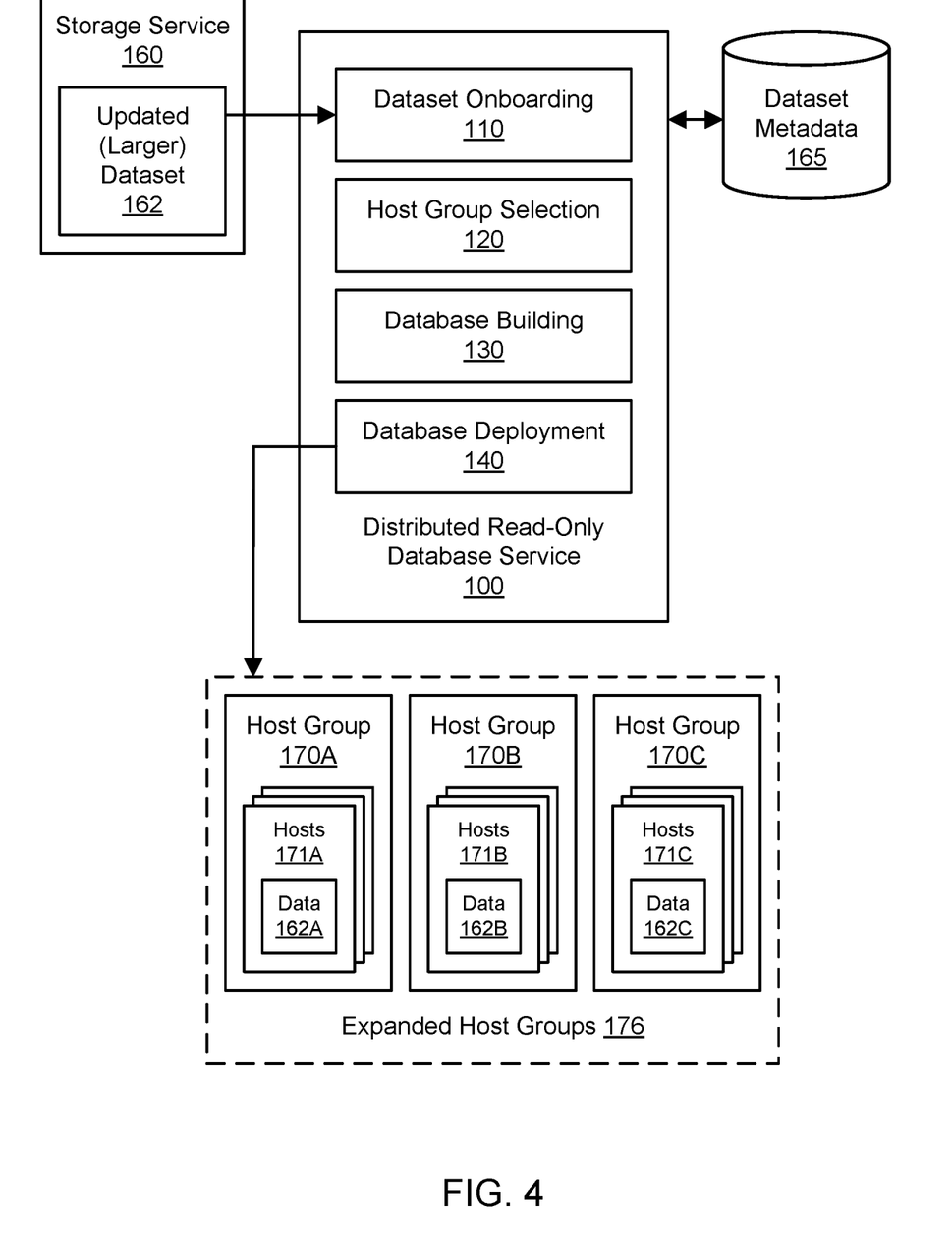
FIG. 4 illustrates further aspects of the example system environment for a distributed read-only database service, including expanding a set of host groups to meet an increase in dataset size, according to one embodiment.

FIG. 4 illustrates further aspects of the example system environment for a distributed read-only database service, including expanding a set of host groups to meet an increase in dataset size, according to one embodiment. In one embodiment, the size of the dataset 161 may be monitored. For example, as shown in FIG. 4, the dataset 161 may be updated over time such that the updated and larger dataset 162 exceeds the user-supplied maximum size. The service 100 may warn a user (e.g., a registered owner 180A of the dataset 161) if particular conditions are observed, such as the size exceeding the user-supplied maximum. In some embodiments, the service 100 may take other actions to remediate such conditions. In one embodiment, if the size of the dataset grows beyond the expected maximum size, then the read-only database service 100 may repartition the dataset across an increased number of host groups. For example, if the read-only database is currently deployed to two host groups 170A and 170B, and the new size of the dataset 162 exceeds the storage capacity of an individual host in the first host group 170A plus an individual host in the second host group 170B, then the service 100 may add a third host group 170C (including hosts 171C) and repartition the dataset across all three host groups 170A-170C in an expanded set of host groups 176. As shown in the example of FIG. 4, the updated dataset 162 may be partitioned into distinct and non-overlapping partitions 162A, 162B, and 162C, where each partition is assigned to a different host group. In one embodiment, the repartitioning may be performed automatically when the service 100 determines that the dataset 162 has exceeded a threshold size, e.g., by polling the storage service 160 for updates to the dataset. In one embodiment, the new dataset 162 may be onboarded, transformed into a read-only database, and deployed to the expanded set of host groups 176 as discussed above with respect to FIG. 1 and FIG. 2.

Figure 5:
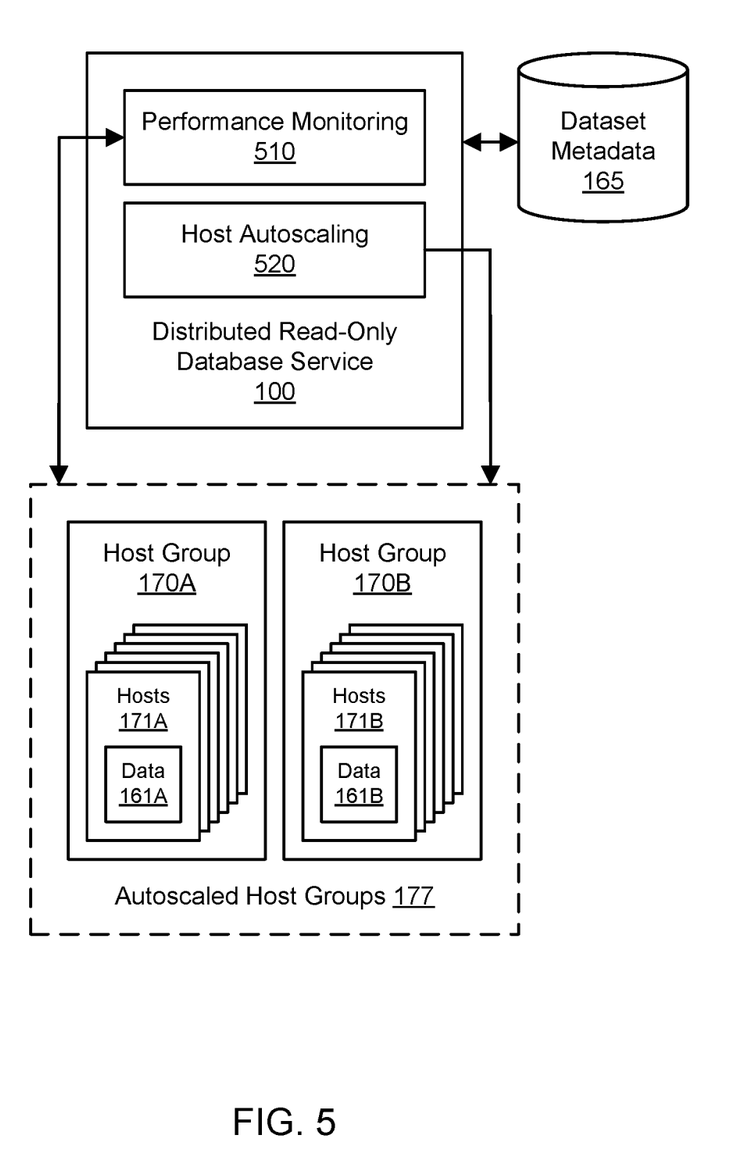
FIG. 5 illustrates further aspects of the example system environment for a distributed read-only database service, including increasing the number of hosts per host group to meet an increase in transaction rate, according to one embodiment.

FIG. 5 illustrates further aspects of the example system environment for a distributed read-only database service, including increasing the number of hosts per host group to meet an increase in transaction rate, according to one embodiment. In one embodiment, the performance of the selected host group(s) 175 may be monitored, e.g., by a performance monitoring component 510 of the distributed system and/or the read-only database service 100. The service 100 may warn a user (e.g., a registered owner 180A of the dataset 161) if particular conditions are observed, such as the transaction rate exceeding the user-supplied maximum. In some embodiments, the service 100 may take other actions to remediate such conditions. For example, if the observed transaction rate for the dataset 161 grows beyond the expected maximum transaction rate for some duration of time, then the read-only database service 100 may increase the number of hosts in one or more of the host groups assigned to the dataset. The service 100 may use a component for host autoscaling 520 to increase or decrease the number of hosts in a host group, e.g., to minimize the number of hosts required to meet a transaction rate for a dataset. As shown in the example of FIG. 5, the service 100 may increase the number of hosts in each of host groups 170A and 170B from three to six. Because each host has its own network capabilities, adding hosts to a host group may increase the number of transactions that the host group can collectively process per unit of time. Similarly, if the observed transaction rate for the dataset is lower than some threshold percentage of the maximum transaction rate for some duration of time, then the read-only database service 100 may decrease the number of hosts in one or more of the host groups assigned to the dataset. In one embodiment, the number of hosts may not be reduced below the minimum number of hosts per host group, e.g., three hosts.

Figure 6:
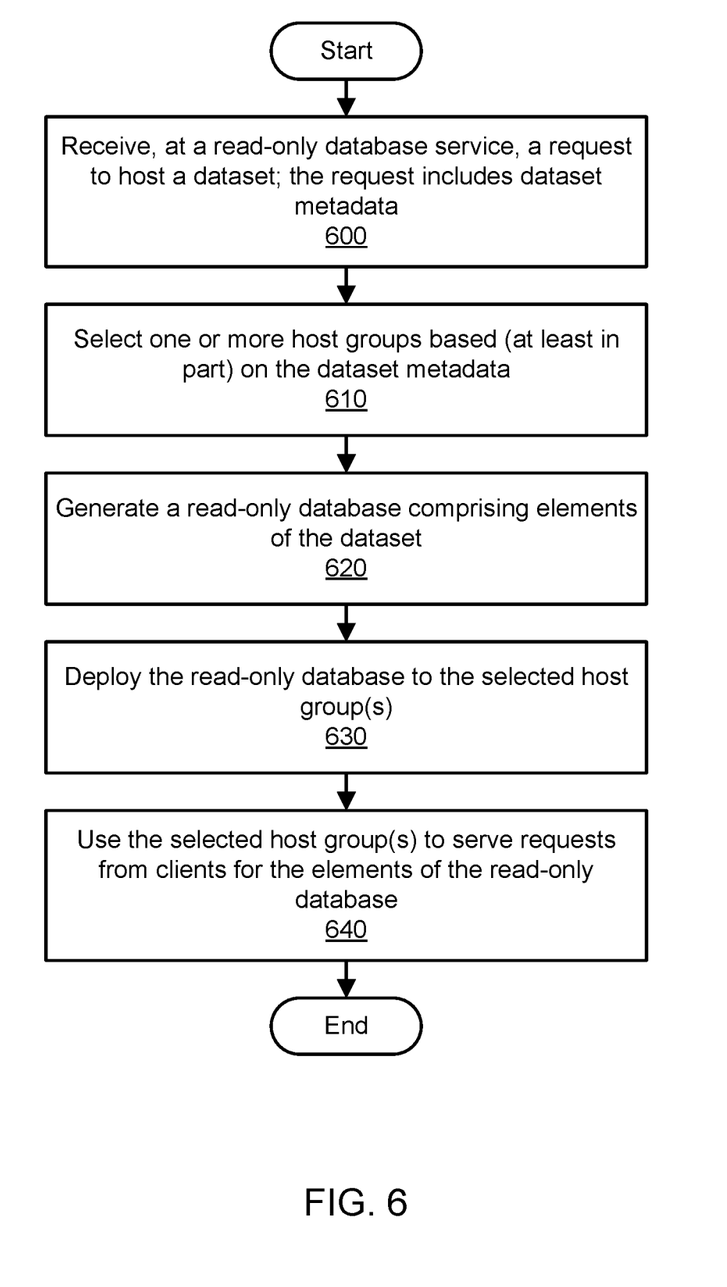
FIG. 6 is a flowchart illustrating a method for using a distributed read-only database service, according to one embodiment.

FIG. 6 is a flowchart illustrating a method for using a distributed read-only database service, according to one embodiment. As shown in 600, a request to register a dataset may be received by a read-only database service. The request may be received from a user, such as an owner or manager of the dataset, using an application programming interface (API) or other programmatic interface offered by the read-only database service. The request may include or be associated with metadata and/or metrics for the dataset. In one embodiment, the request may indicate a maximum size that the user expects the dataset to reach. In one embodiment, the request may indicate a number of partitions of the dataset. In one embodiment, the request may indicate the maximum transaction rate (e.g., in transactions per second) which the user expects for the dataset. In one embodiment, the dataset may be retrieved from a storage service, e.g., from a particular "bucket" associated with the user who supplied the request. In one embodiment, the service may poll the storage service until the dataset is available.

As shown in 610, one or more host groups may be selected for the dataset by the read-only database service. The service may be offered in a distributed system, and the distributed system may include available host groups that are not currently in use for serving read-only database requests. Each host group may include one or more hosts (servers), and each host may include network capabilities as well as storage resources that can store elements of a read-only database. In one embodiment, a host group may include a minimum of three hosts, e.g., in order to provide fault tolerance for the data replicated across the hosts in the host group. In one embodiment, the service may select the host group(s) for the dataset from the available host groups based (at least in part) on the metadata and/or metrics such as the expected maximum size of the dataset and the expected transaction rate of the dataset. In one embodiment, the number of host groups for a dataset may be selected by the service based (at least in part) on the expected maximum size of the dataset. For example, datasets exceeding the storage capacity of one host may be partitioned across multiple host groups. In one embodiment, the number of hosts per host group may be selected by the service to meet the expected transaction rate, where more hosts may be used for higher transaction rates and fewer hosts may be used for lower transaction rates. In one embodiment, the number of host group(s) and the number of hosts per group may be selected in order to minimize the computational and storage resources (e.g., the number of hosts) assigned to the dataset. In one embodiment, hosts may vary in their storage capacity, and hosts for a dataset may be selected based (at least in part) on the similarity of their storage capacity to the expected maximum size of the dataset. In one embodiment, hosts may vary in their maximum transaction rate, and hosts for a dataset may be selected based (at least in part) on their maximum transaction rate.

As shown in 620, the read-only database service may generate a read-only database comprising elements of the dataset. The read-only database may include key-value pairs. In one embodiment, the read-only database may represent a compressed version of the dataset, e.g., a version that takes less space to store and/or less time to retrieve individual elements. In one embodiment, the read-only database may be implemented using a B-tree or other data structure that can be traversed efficiently. In one embodiment, the read-only database may include multiple partitions, where each partition can be deployed to a different host group of the selected host groups. In one embodiment, the service may validate the dataset before building the read-only database. Validation may include determining that elements of the dataset are valid data types, formatted properly, and so on. In one embodiment, validation may be performed according to validation techniques specified by a user, e.g., by calling a program indicated by the user.

As shown in 630, the read-only database may be deployed to the selected host group(s) by the read-only database service. Deployment may include copying elements of the read-only database to the storage resources of the individual hosts. In one embodiment, the data deployed to a host group may be replicated across the hosts in that group, such that any host in the group may serve a request for any element of the data assigned to the group. In one embodiment, a read-only database may be partitioned across multiple host groups, such that some elements of the dataset may be served exclusively by one host group while other elements of the dataset may be served exclusively by another host group. For example, datasets exceeding the storage capacity of one host may be partitioned across multiple host groups. In one embodiment, datasets registered with the read-only database service may be updated infrequently and may grow in size slowly, such that the number of host groups needed to host the dataset may also change slowly.

As shown in 640, the selected host group(s) may serve requests from clients for the elements of the read-only database. A client of the service may use a client library to identify an appropriate host group as the recipient of a particular request for the read-only database. The request may seek one or more values associated with a particular key in the read-only database. In one embodiment, by applying a hashing function to the key and the dataset name, the client library may determine and cache the name or address of the host group that serves requests for that key. In one embodiment, the client library may obtain from the service a list of all the host groups for a particular dataset. In one embodiment, the hashing function itself may be provided to the client by the read-only database service and may be cached in memory at the client for use in determining the recipient of a request for any key in the dataset. In one embodiment, a host group may be associated with a load balancer, and the load balancer may be specific to the host group. In one embodiment, the load balancer may distribute requests across hosts in the host group on any suitable basis, e.g., using a round-robin approach and/or selecting the host with the least number of connections. In one embodiment, clients may make direct connections to host groups or to host-group-specific load balancers, thereby avoiding the need for a centralized routing layer that would represent a single point of failure for all the host groups maintained by the service. Accordingly, the read-only database service may provide a degree of isolation and fault tolerance among different host groups.

In one embodiment, the performance of the selected host group(s) may be monitored, e.g., by a monitoring component of the distributed system and/or the read-only database service. The service may warn a user (e.g., a registered owner or manager of the dataset) if particular conditions are observed, such as the transaction rate or size exceeding the user-supplied maximum. In some embodiments, the service may take other actions to remediate such conditions. In one embodiment, if the size of the dataset grows beyond the expected maximum size, then the read-only database service may repartition the dataset across an increased number of host groups. For example, if the read-only database is currently deployed to one host group, and the new size exceeds the storage capacity of an individual host in that host group, then the service may add a second host group and partition the dataset across both host groups. As another example, if the read-only database is currently deployed to two host groups, and the new size of the complete dataset exceeds the storage capacity of an individual host in the first host group plus an individual host in the second host group, then the service may add a third host group and repartition the dataset across all three host groups. If the observed transaction rate for the dataset grows beyond the expected maximum transaction rate for some duration of time, then the read-only database service may increase the number of hosts in one or more of the host groups assigned to the dataset. Because each host has its own network capabilities, adding hosts to a host group may increase the number of transactions that the host group can collectively service per unit of time. Similarly, if the observed transaction rate for the dataset is lower than some percentage of the maximum transaction rate for some duration of time, then the read-only database service may decrease the number of hosts in one or more of the host groups assigned to the dataset.

Illustrative Computer System

In at least some embodiments, a computer system that implements a portion or all of one or more of the technologies described herein may include a general-purpose computer system that includes or is configured to access one or more computer-readable media. FIG. 7 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    a plurality of available host groups comprising a plurality of read-only database servers in a distributed system, wherein the read-only database servers comprise storage resources;
    one or more computing devices configured to implement a distributed read-only database service, wherein the distributed read-only database service is configured to:
        receive a request to register a dataset, wherein the request indicates an anticipated size of the dataset and an anticipated transaction rate of read requests for elements of the dataset;
        based at least in part on the anticipated size of the dataset and the anticipated transaction rate of read requests for elements of the dataset, determine a number of hosts or host groups to host the dataset;
        select one or more host groups from the plurality of available host groups according to the determined number;
        generate a read-only database comprising elements of the dataset; and
        deploy the read-only database to the storage resources of the one or more host groups selected in the distributed system, wherein the one or more host groups selected are configured to serve a plurality of read requests from clients for the elements of the read-only database.

2. The system as recited in claim 1, wherein a number of the one or more host groups is selected based at least in part on the anticipated size of the dataset, and wherein a number of servers per host group is selected based at least in part on the anticipated transaction rate.

3. The system as recited in claim 1, wherein the distributed read-only database service is further configured to:
    determine that an observed transaction rate for the one or more host groups exceeds the anticipated transaction rate; and
    based at least in part on the observed transaction rate exceeding the anticipated transaction rate, add one or more additional servers to the one or more host groups.

4. The system as recited in claim 1, wherein the distributed read-only database service is further configured to:
    determine that an updated size of the dataset exceeds the anticipated size;
    based at least in part on the updated size exceeding the anticipated size, select an increased number of host groups for the dataset; and
    repartition the dataset across the increased number of host groups.

5. A computer-implemented method, comprising:
    based at least in part on a size of a dataset and a transaction rate for read requests for elements of the dataset, determining a number of hosts or host groups to host the dataset and selecting, based on the determined number, one or more host groups from a plurality of available host groups in a distributed system, wherein the one or more host groups comprise respective one or more hosts comprising storage resources;
    generating a read-only database comprising elements of the dataset; and
    deploying the read-only database to the storage resources of the one or more host groups in the distributed system, wherein the one or more host groups are configured to serve a plurality of requests from clients for the elements of the read-only database.

6. The method as recited in claim 5, wherein selecting the one or more host groups comprises selecting a number of host groups based at least in part on the size of the dataset and selecting a number of hosts per host group is based at least in part on the transaction rate, and wherein the one or more host groups are selected by a read-only database service.

7. The method as recited in claim 5, wherein selecting the one or more host groups from the plurality of available host groups comprises minimizing a number of hosts in the one or more host groups.

8. The method as recited in claim 5, further comprising:
    determining that an observed transaction rate for the one or more host groups exceeds a threshold transaction rate; and
    based at least in part on the observed transaction rate exceeding the threshold transaction rate, adding one or more additional hosts to the one or more host groups.

9. The method as recited in claim 5, further comprising:
    determining that an updated size of the dataset exceeds a threshold size;
    based at least in part on the updated size exceeding the threshold size, selecting an increased number of host groups for the dataset; and
    repartitioning the dataset across the increased number of host groups.

10. The method as recited in claim 5, wherein the clients comprise instances of a client library, and wherein a particular host group of the one or more host groups is identified using the client library as a destination for a particular one of the requests.

11. The method as recited in claim 5, wherein a selection strategy for the dataset is obtained from a database service, cached at the clients, and used a plurality of times at a particular one of the clients to identify a particular host group of the one or more host groups as a destination for a particular one of the requests.

12. The method as recited in claim 5, wherein one or more additional requests from the clients are served using a cache of updates to the dataset.

13. A computer-readable storage medium storing program instructions computer-executable to perform:
    based at least in part on an expected size of a dataset and an expected transaction rate for read requests for elements of the dataset, determining a number of hosts or host groups to host the dataset and selecting, based on the determined number, one or more host groups from a set of available host groups in a distributed system, wherein the selected one or more host groups comprise one or more hosts comprising storage resources;
    building a read-only database comprising the dataset; and copying the read-only database to the storage resources of the selected one or more host groups in the distributed system, wherein the selected one or more host groups are configured to serve a plurality of read requests from clients for values of the read-only database.

14. The computer-readable storage medium as recited in claim 13, wherein selecting the one or more host groups comprises selecting a number of host groups based at least in part on the expected size of the dataset and selecting a number of hosts per host group based at least in part on the expected transaction rate, and wherein the one or more host groups are selected by a read-only database service.

15. The computer-readable storage medium as recited in claim 13, wherein selecting the one or more host groups from the plurality of available host groups comprises minimizing a number of hosts in the one or more host groups.

16. The computer-readable storage medium as recited in claim 13, wherein the program instructions are further computer-executable to perform:

determining that an observed transaction rate for the one or more host groups exceeds the expected transaction rate; and based at least in part on the observed transaction rate exceeding the expected transaction rate, adding one or more additional hosts to the one or more host groups.

17. The computer-readable storage medium as recited in claim 13, wherein the program instructions are further computer-executable to perform:

determining that an updated size of the dataset exceeds the expected size;

based at least in part on the updated size exceeding the expected size, selecting an increased number of host groups for the dataset; and repartitioning the dataset across the increased number of host groups.

18. The computer-readable storage medium as recited in claim 13, wherein the clients comprise instances of a client library, and wherein a particular host group of the one or more host groups is identified using the client library as a destination for a particular one of the requests.

19. The computer-readable storage medium as recited in claim 13, wherein a hashing function associated with the dataset is obtained from a database service, cached at the clients, and used a plurality of times at a particular one of the clients to identify a particular host group of the one or more host groups as a destination for a particular one of the requests.

20. The computer-readable storage medium as recited in claim 13, wherein the program instructions are further computer-executable to perform:

validating a size of the dataset prior to building the read-only database, wherein the size of the dataset is compared to a size of a prior version of the dataset.

* * * * *